(12) United States Patent
Reasor et al.

(10) Patent No.: US 7,600,019 B2
(45) Date of Patent: Oct. 6, 2009

(54) SYSTEM AND METHOD FOR AGGREGATING AND EXTENDING PARENTAL CONTROLS AUDITING IN A COMPUTER NETWORK

(75) Inventors: Sterling Reasor, Bellevue, WA (US); Christopher A. Evans, Sammamish, WA (US); Jason Christensen, Kirkland, WA (US); John Brezak, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 37 days.

(21) Appl. No.: 12/108,321

(22) Filed: Apr. 23, 2008

(65) Prior Publication Data

US 2008/0201469 A1 Aug. 21, 2008

Related U.S. Application Data

(62) Division of application No. 10/823,277, filed on Apr. 13, 2004, now Pat. No. 7,389,346.

(51) Int. Cl.
*G06F 15/16* (2006.01)
*G06F 15/173* (2006.01)
*G06F 15/177* (2006.01)

(52) U.S. Cl. ..................... 709/224; 709/228; 713/150

(58) Field of Classification Search ........... 709/17–228, 709/200–203; 713/150
See application file for complete search history.

(56) References Cited

U.S. PATENT DOCUMENTS

| 6,622,168 | B1 | 9/2003 | Datta | |
|---|---|---|---|---|
| 2002/0184496 | A1* | 12/2002 | Mitchell et al. | 713/168 |
| 2004/0210767 | A1* | 10/2004 | Sinclair et al. | 713/201 |
| 2005/0081043 | A1* | 4/2005 | Evans et al. | 713/182 |
| 2005/0198319 | A1* | 9/2005 | Chan et al. | 709/228 |

OTHER PUBLICATIONS

Munro, J., "Parental Guidance Suggested," PC Magazine, Jul. 1, 2003, 5 pages.

* cited by examiner

*Primary Examiner*—Haresh N Patel
(74) *Attorney, Agent, or Firm*—Senniger Powers LLP

(57) ABSTRACT

A system and method for aggregating and extending parental controls auditing in an unmanaged computing network are provided. A parental control system, including a parental control database, logging interface, and audit process, resides on each host computing device in an unmanaged computing network that is capable of synchronizing data residing on one of the host computing devices with data residing on the other devices in the network. The parental control system facilitates the logging and reporting of parental control audit information in a manner that allows parents to aggregate the audit information to obtain a comprehensive audit report of their children's use of all computers in the home, and is extensible and customizable by the applications from which the parental control audit information originates.

15 Claims, 11 Drawing Sheets

SYSTEM AND METHOD FOR AGGREGATING AND EXTENDING PARENTAL CONTROLS AUDITING IN A COMPUTER NETWORK

CROSS-REFERENCE TO RELATED APPLICATION

This application is a divisional of U.S. application Ser. No. 10/823,277, now U.S. Pat. No. 7,389,346, filed Apr. 13, 2004, which application is incorporated herein by reference in its entirety.

FIELD OF THE INVENTION

In general, the present invention relates to computer software and computer communication networks and, in particular, to a system and method for aggregating and extending parental controls auditing in an unmanaged computer network.

BACKGROUND OF THE INVENTION

Parental control systems for computers and television have become increasingly popular as more and more homes have access to the Internet and extensive cable or satellite television offerings. With respect to computers and Internet usage, parents especially want to know what their children are doing when they use the computer, including the web sites they visit and the individuals with whom they are communicating.

Some applications, such as those provided by Internet service providers MSN and America Online (AOL), provide parental controls, but they are limited to restricting and auditing usage of features inside the application. Another problem with existing parental controls solutions is that the parents receive fragmented audit reports when their children use multiple computers located throughout the home. For example, if a child uses a computer in the kitchen and then a computer in his room, the parent will get two reports that he or she will have to cross reference manually. In the multiple-computer household, children might attempt to circumvent parental controls by purposefully using different computers to get more time on the computer than allowed, or to use a computer having a program (or unrestricted access to the Internet) that is not available on their own computer. Efforts to maintain such information in a centralized server outside of the home but accessible to the parents raises privacy issues that makes such a solution undesirable.

Connecting the household computers to a home network might offer parents some additional control, such as providing a single point of access to the Internet from which certain computers in the home may be disconnected from time to time. But unlike a managed computing network environment, common to business and other large-scale computing networks, the typical home network is an unmanaged network that offers parents little in the way of control. For example, a home network does not typically incorporate a primary domain controller for regulating user access or centralized data file storage. Instead, many unmanaged computing networks require individual user management in terms of regulating user security authorization to use the various computing devices on the network. Further, most unmanaged networks require additional user participation and knowledge to store, recall and synchronize content stored on the various computing devices on the network. As a consequence, the home network offers few benefits in terms of parental control, since existing parental control solutions in a home network are constrained by the network's limitations to operate independently on each computing device, just the same as if the device were not on the network. Moreover, the home network may also introduce other problems, such as providing the children access to unprotected files on the parents' computer, such as the parents' financial or other personal files, e.g. Microsoft Money, etc.

Another problem with existing parental control systems today is that third party applications using a proprietary parental control system are forced to log events so that they conform to the style dictated by the proprietary system's auditing schema. Since not all applications that the parents install on their computers will conform to the proprietary auditing schema, there may be gaps in the audit reports generated by the parent control system. Parents are, therefore, unable to get the full picture of their children's computer usage. For example, parents may not be aware of which games, movies, or other activities their children are involved in using computers in the home.

SUMMARY OF THE INVENTION

A system and method for aggregating and extending parental controls auditing in an unmanaged computing network are provided. A parental control system, including a parental control database, logging interface, and audit process, resides on each host computing device in an unmanaged computing network that is capable of synchronizing data residing on one of the host computing devices with data residing on the other devices in the network. The parental control system facilitates the logging of parental control audit information associated with a unique user identifier of a restricted user, e.g., a particular child's user account, in a manner that is extensible and customizable by the applications from which the parent control audit information originates. The parental control system further facilitates the reporting of the audit information in a manner that allows parents to aggregate the audit information to obtain a comprehensive audit report of their children's use of all computers in the home.

In accordance with an aspect of the present invention, the logging interface permits applications, including any services running on any host computing device in the network, to log parental control audit information to a resident copy of the parental control database using a universal schema. The parental control audit information may include any information associated with the unique user identifier that may be of interest to a parent that is recorded, collected, or otherwise generated by an application or service activated or otherwise used by the uniquely identified user on any device in the network. The universal schema may be any data representation format that facilitates universal access to the logged parental control audit information, such as the Extensible Markup Language (XML). During operation, each resident copy of the parental control database is synchronized with each other copy of the database residing on the other host computing devices in the network.

In accordance with another aspect of the present invention, the audit process receives a request from a parent for an aggregated view of the content of the parental control database corresponding to a set of criteria, such as for a particular child, a particular period of time, or for a particular application or service. Periodically, or in response to the parent's request, the audit process generates an audit report containing an aggregated view of the content from the resident copy of the synchronized parental control database.

In accordance with one aspect of the present invention, the logging interface further permits applications and services to provide a customizable style that controls what audit information is logged to the resident copy of the parental control database and how that logged information should be displayed or presented during the audit process. The customizable styles may be in any universally recognized format for transforming and presenting data such as the Extensible Stylesheet Language Transformations (XSLT) language. The customizable styles are stored in a resident copy of a custom log styles database in a host computing device on the network. Similar to the parental control database, each resident copy of the custom log styles database is synchronized with each other copy of the custom log styles database residing on the other host computing devices in the network. In operation, the audit process generates the audit report from the resident copies of both the synchronized parental control database and synchronized custom log styles database. The parental control database contains the actual parental control audit information that was logged by the applications or services, and the custom log styles database contains the style data that controls how the information is presented in the audit report to a parent or child end user.

In accordance with a further aspect of the present invention, the parental control system further includes a notification process in which a parent or child is notified that the parental control system has been activated and whether there is available any logged parental control audit information in the parental control database from which to generate an audit report. The notification process may operate periodically as a reminder to parents to check their children's computer usage, or continuously in real-time in response to detecting that an application or service is logging parental control audit information to the parental control database, or notify a user that parental control auditing has commenced or terminated.

In accordance with yet another aspect of the present invention, the audit process generates an audit report from the point of view of the parent or the child, i.e., the restricted user whose computer usage is being audited. The audit process further generates a summary audit report or a detail report, and may be dynamically altered to generate a summary or detailed report in response to a user input. The audit process may further generate a report of the parental control settings for a particular child as received via a parent input to the system.

In accordance with yet other aspects of the present invention, a computer-accessible medium for aggregating and extending parental controls auditing in an unmanaged computing network is provided. The computer-accessible medium comprises data structures and computer-executable components comprising a parental control system and method, including a parental control database, custom log styles database, logging interface, and audit process for permitting applications and services to log parental control audit information for a computer user in a manner that is extensible and customizable by the application, as well as in a manner that may be aggregated for presenting a comprehensive audit report of the user's computer usage. The data structures define parental control audit information, logging interfaces, and audit reports in a manner that is generally consistent with the above-described system and method. Likewise, the computer-executable components are capable of performing actions generally consistent with the above-described system and method.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
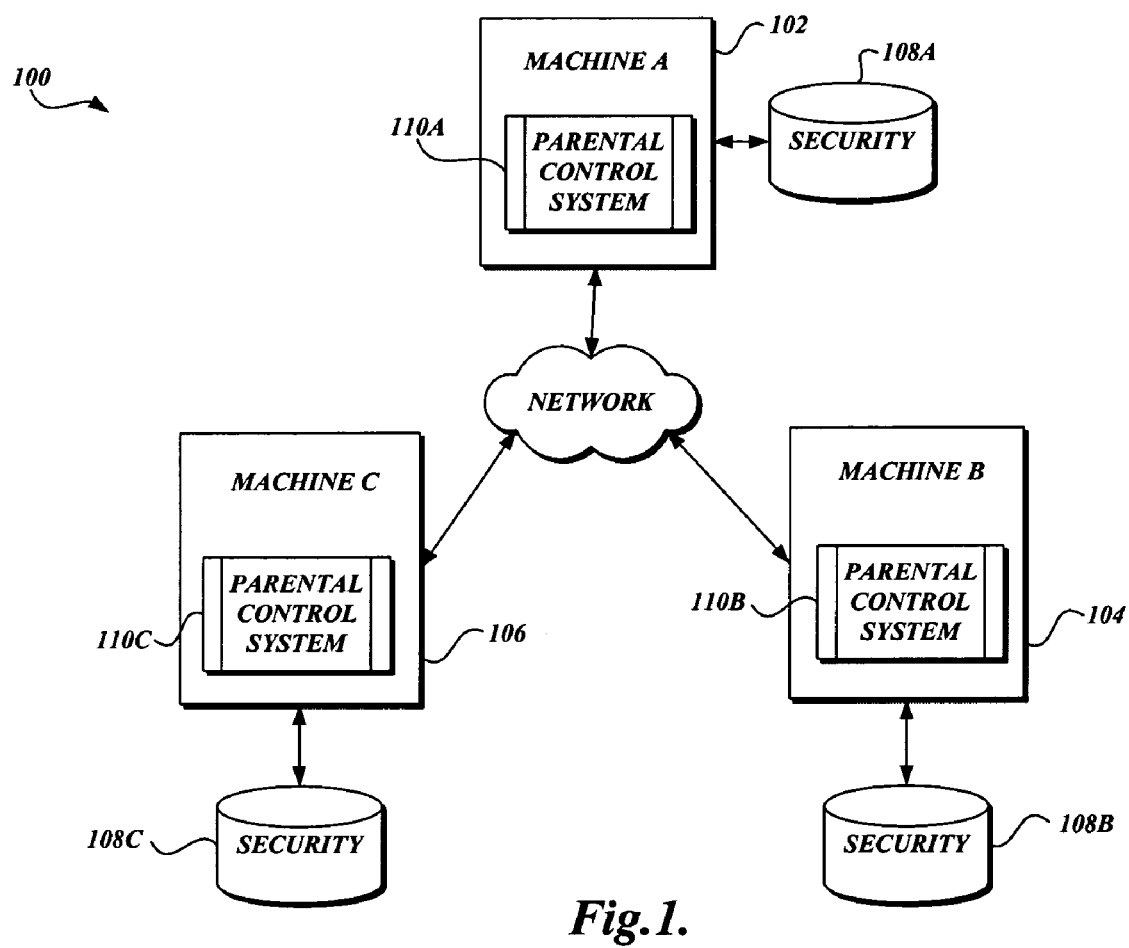
FIG. 1 is a block diagram of an unmanaged computer network including three computing devices having a parental control system formed in accordance with the present invention.

Generally described, the present invention corresponds to a system and method for aggregating and extending parental controls auditing in an unmanaged computing network. More specifically, the present invention corresponds to a system and method for facilitating the logging of parental control audit information associated with a unique user identifier, i.e. a particular child's user account, in a manner that is extensible and customizable by the applications from which the parental control audit information originates. The system and method further facilitates the reporting of the audit information in a manner that allows parents to aggregate the audit information to obtain a comprehensive audit report of their children's use of all computers in the home, i.e., all computing devices in the unmanaged network. In the discussion that follows, the term "parent" is generally used to describe the administrative, or unrestricted user, and the term "child" is generally used to describe a restricted user, i.e., any user upon whom a restriction has been placed by an administrator. Although the present invention will be described with regard to an unmanaged network in which all the network computing devices have common security profiles for all authorized users of the network, one skilled in the relevant art will appreciate that the present invention may be implement in alternative unmanaged networks in which each computing device may maintain separate security profiles for authorized network users. Further, one skilled in the relevant art will appreciate that some or all of the aspects of the present invention may be practiced in managed computer networks.

In addition, while the computing system will be described in the general context of a personal computer usable in a distributed computing environment, where complementary tasks are performed by remote computing devices linked together through a communication network, those skilled in the art will appreciate that the invention may be practiced with many other computer system configurations, including multiprocessor systems, minicomputers, mainframe computers, and the like. In addition to the more conventional computer systems described above, those skilled in the art will recognize that the invention may be practiced on other computing devices including laptop computers, tablet computers, personal digital assistants (PDAs), and other devices upon which computer software or other digital content is installed. Moreover, while aspects of the invention may be described in terms of applications and interfaces executed by an operating system in conjunction with a personal computer, those skilled in the art will recognize that those aspects also may be implemented in combination with other program modules or subsystems, such as a security subsystem of the operating system. Generally, program modules include routines, programs, subprograms, subroutines, interfaces, components, data structures, etc., that perform particular tasks or implement particular abstract data types.

For the sake of convenience, much of the description herein is provided in the context of the Microsoft Windows operating system and associated security subsystem. In particular, although the description of the computing system suitable for implementing various features of the invention will include references to the Windows operating system and security subsystem, those skilled in the art will recognize that the invention may be practiced in the context of other operating systems and security subsystems.

In view of the foregoing, the embodiments described with regard to the present invention are illustrative in nature and should not be construed as limiting.

FIG. 1 is a block diagram illustrative of a parental control system 110 operating in an unmanaged network 100 including three computing devices 102, 104, and 106 in accordance with the present invention. The computing devices 102, 104, 106 may be embodied as any one of a variety of devices that may be utilized to persist content to the computer network 100. Examples of computing devices include, but are not limited to, personal computing devices, hand-held computing devices, server-based computing devices, personal digital assistants, mobile telephones, stand-alone memory devices, electronic devices having some type of memory, and the like.

In an illustrative embodiment of the present invention, each computing device 102, 104 and 106 maintains a database of security information 108 that corresponds to a unique security identifier ("SID") for each authorized user. The database 108 may also maintain information associating unique user SIDs to one or more groups of users of the parental control system, e.g., a family of users, including a parent-administrator, parent-users, child-users, and a unique security identifier for the group. In accordance with the illustrative embodiment, the security information database 108 is replicated at each of the computing devices 102, 104, 106 such that a user's security profile, including a user SID, is accessible at any one of the computing devices. A more detailed explanation of the replicating of security profile information across an unmanaged network can be found in commonly assigned, co-pending application, U.S. patent application Ser. No. 10/414,354, entitled SMALL-SCALE SECURED COMPUTER NETWORK GROUP WITHOUT CENTRALIZED MANAGEMENT, filed on Apr. 15, 2003, and which is incorporated by reference herein.

As illustrated in FIG. 1, for a particular user, a first computing device 102, "MACHINE A", maintains data in a first parental control system 110A, residing in a local memory that can be accessed in some manner by the user. Similarly, a second computing device 104, "MACHINE B" maintains data in a second parental control system 110B and a third machine 106, "MACHINE C", maintains data in a second parental control system 110C., from which systems data may be accessed in some manner by the user. As will be explained in additional detail below, the data maintained in the parental control systems 110A, 110B, and 110C are associated with an access control list ("ACL") that indicates which user SIDs and group SIDs that may have access to the particular data. Additionally, each ACL may also indicate limitations to the type of access to the data a particular user SID or group SID may have. For example, an ACL may indicate that a particular user may access to read the data, but cannot modify the data in any manner. Further, each ACL may also indicate a current owner of the data corresponding to the user SID that created and/or last edited the data.

Figure 2:
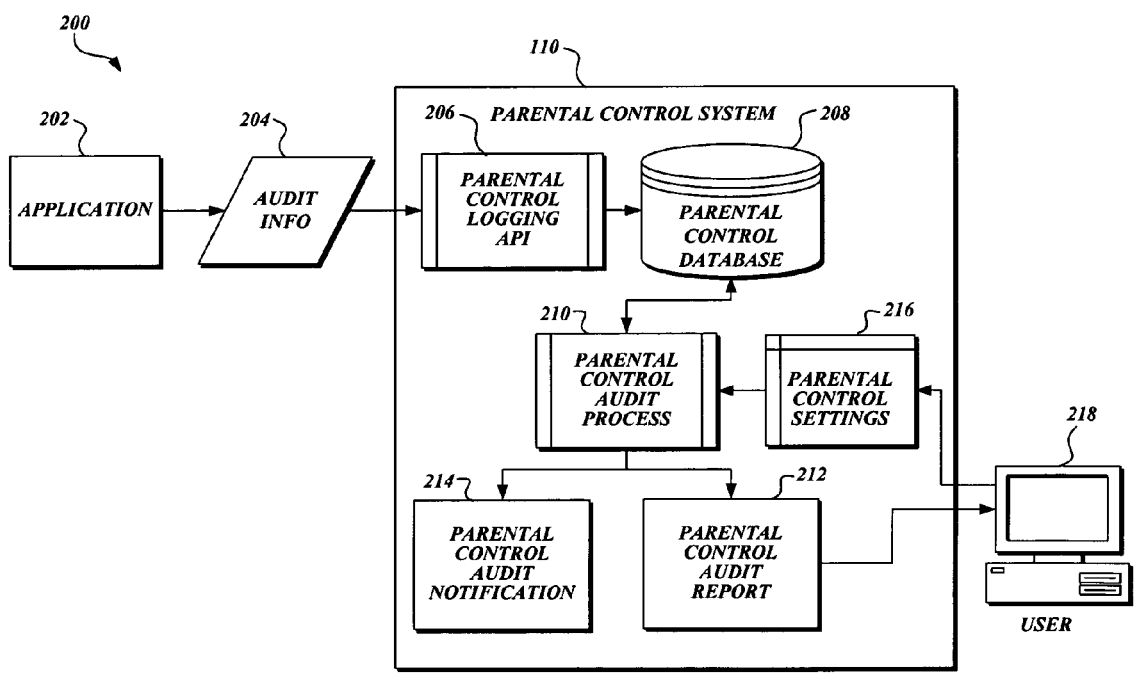
FIG. 2 is a block diagram depicting in further detail an arrangement of certain components of the parental control system illustrated in FIG. 1, and in accordance with an embodiment of the present invention.

FIG. 2 is a block diagram depicting in further detail an arrangement 200 of certain components of the parental control system 110 illustrated in FIG. 1, and in accordance with an embodiment of the present invention. As shown, the parental control system 110 comprises, among other components, a parental control database 208, a parental control logging application programming interface (API) 206, a parental control audit process 210, a parental control audit report 212, a parental control audit notification 214, and parental control settings data 216 maintained in memory or stored in the parental control database 208. In operation, an application 202, such as Microsoft's Internet Explorer browser application, Outlook Express email application, MSN instant messenger application, Windows Media Player application, eHome application, etc. collects, records, or otherwise generates audit information 204 comprising data that is logged to the parental control database 208 via the parental control logging API 206. The parental control audit process 210 accesses the parental control database 208 to generate parental control audit reports 212 and parental control audit notifications 214 on behalf of an authorized user 218, and in accordance with the parental control settings 216. The authorized user 218 has an associated unique user SID in the security information database 108 that identifies him or her as one of a family of users, such as a parent-administrator, parent-user, or child-user, having access to the audit information 204 that was logged into the parental control database 208 in a manner appropriate to their status. For example, the child user will not be able to edit the audit information 204 or any other data (e.g. the parental control settings 216) logged or otherwise stored in the parental control database 208 or in memory, but may be able to view the data in an audit report 212 or receive a notification 214 regarding the audit. As another example, in order to preserve the integrity of the audit information 204, applications 202 will be able to log audit information to the parental control database 208 on behalf of a parent-user, but will not generally be able to alter the information once logged.

Figure 3:
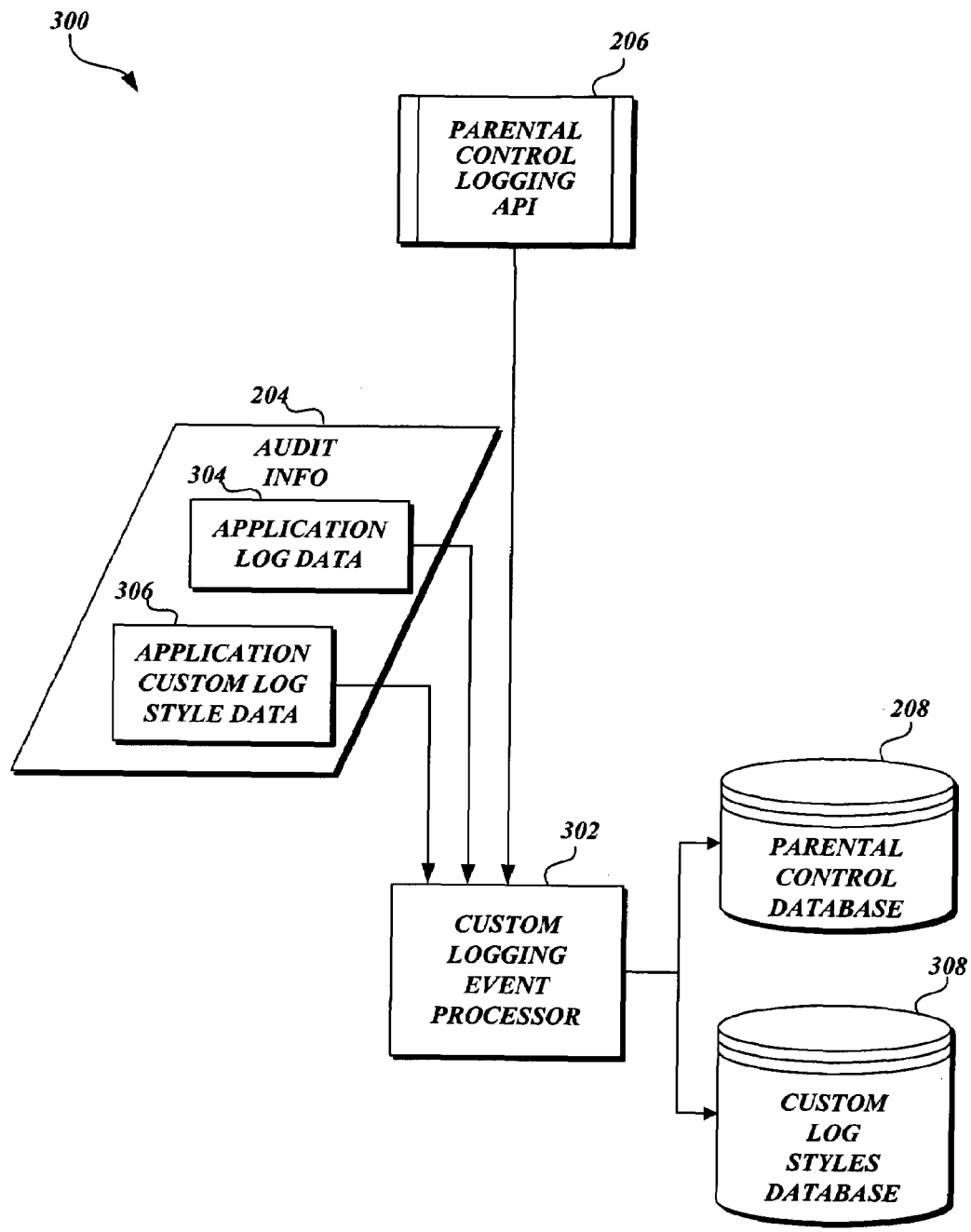
FIG. 3 is a block diagram depicting in further detail an arrangement of certain components of a parental control logging interface of FIG. 2 illustrating the custom logging of application-originated parental control audit information and custom log styles in accordance with the present invention.

FIG. 3 is a block diagram depicting in further detail an arrangement 300 of certain components of a parental control logging interface 206 of FIG. 2 illustrating the custom logging of application-originated parental control audit information 204, including custom log styles in accordance with the present invention. The parental control logging API 206 includes a custom logging event process 302 that receives audit information 204 from applications 202, including application log data 304, and, optionally, custom log style data 306. The application log data 304 may be any data that is capable of being collected, recorded, or otherwise generated from an application 202, and that may be of interest to a user of the parental control system 110. Examples of application log data 304 include the web site destinations that a child has visited, e.g. data containing the uniform record locator (URL) of the web site, the name of the application that the child is using, e.g. "Internet Explorer," the amount of time that a child has been using a particular application, e.g. data containing the elapsed time of a user's session, and the time and date that the child used the computer, e.g. data containing the calendar date and time that the child used the computer. In a preferred embodiment, the application log data 304 is encoded in a universally accessible data representation format, such as an XML document. In this way, the application 202 can easily provide the data without having to conform to any particular or proprietary format, and the logging process 302 can process the data without having to know anything about the application that provided the data.

The custom log style data 306 provides the third party applications 202 with the option to extend and customize the audit reporting available to the parent using the parental control system 110. In this way a third party application may control what information is logged to the parental control database 208, and how it is reported to the parent (or child). For example, if the parent installs a third party digital video disc player (DVD) on the family computer, the DVD application might log the titles of all of the DVD movies that her child watches on the computer. When the parental control audit report is later obtained by the parent, it will list not only all of the movie titles that the child watched, but also the Motion Picture Association (MPAA) ratings, objectionable content assessments (e.g., violence, nudity), and the cast. The audit information logged by the DVD application may be specified using a universally accessible schema, such as XML. The custom log data 206 may include the universally accessible log schema as well as a style guide, such as an XSL style sheet. The custom XML schema contains the format of an XML document (e.g., Title, MPAA rating, Content, Cast), and the XSL style sheet is a file that describes how to display an XML document of a given type.

For example, in one embodiment, during application installation and setup, the application 202 will register an XML schema with the parental control system 110 that contains the format of the data describing the custom audit events that the application intends to log along with a custom report XSL style sheet for each report the application 202 wants to provide to the user. The registered XML schema and XSL style sheet are stored on the custom log styles database 308. During operation, the application 202 uses the parental control logging API 206 and custom logging event processor 302 to log application-originated data 304 about the event in the parental control database 208 in accordance with the XML schema. Subsequently, the parental control audit process 210 accesses the custom log styles database 308 to retrieve the XML schema and XSL style sheet to determine how to present the logged data to the parent-user when generating the parental control audit report 212 and/or parental control audit notification 214.

It is understood that the parental control database 208 and custom log styles database 308 are shown as separate data repositories for the sake of illustration, and that the data they represent may be stored using other means. For example, as described in the next two figures, FIGS. 4-5, the databases 208, 308 may be implemented as tables in a Windows File System (WinFS) database. Thus, the databases 208, 308 may be implemented in a variety of ways without departing from the scope of the claims that follow.

Figure 4:
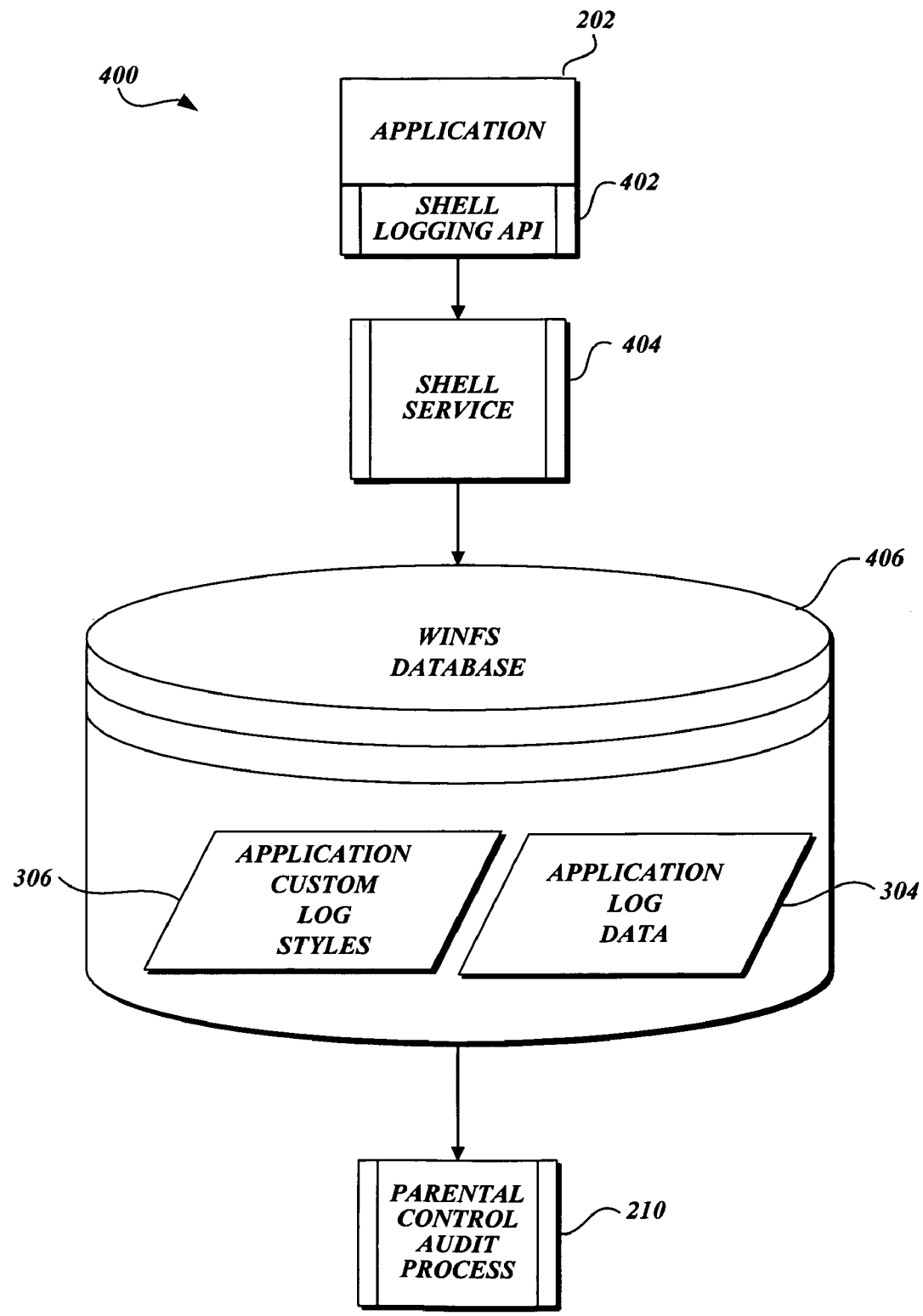
FIG. 4 is a block diagram of an exemplary arrangement of certain components of a parental control system of FIG. 1 illustrating the custom logging of application-originated parental control audit information and custom log styles in accordance with the present invention.

FIG. 4 is a block diagram of an exemplary arrangement 400 of certain components of a parental control system 110 of FIG. 1 illustrating the custom logging of application-originated log data 304 and custom log styles 306 in accordance with the present invention. In the illustrated embodiment, the application 202 calls a Windows Shell interface, a Shell Logging API 402, that provides a Shell service 404 of logging application log data 304 and application custom log styles 306 to the Windows File System (WinFS) database 406, where they may be accessed by the parental control audit process 210, to generate reports, notifications, etc. as needed.

Figure 5:
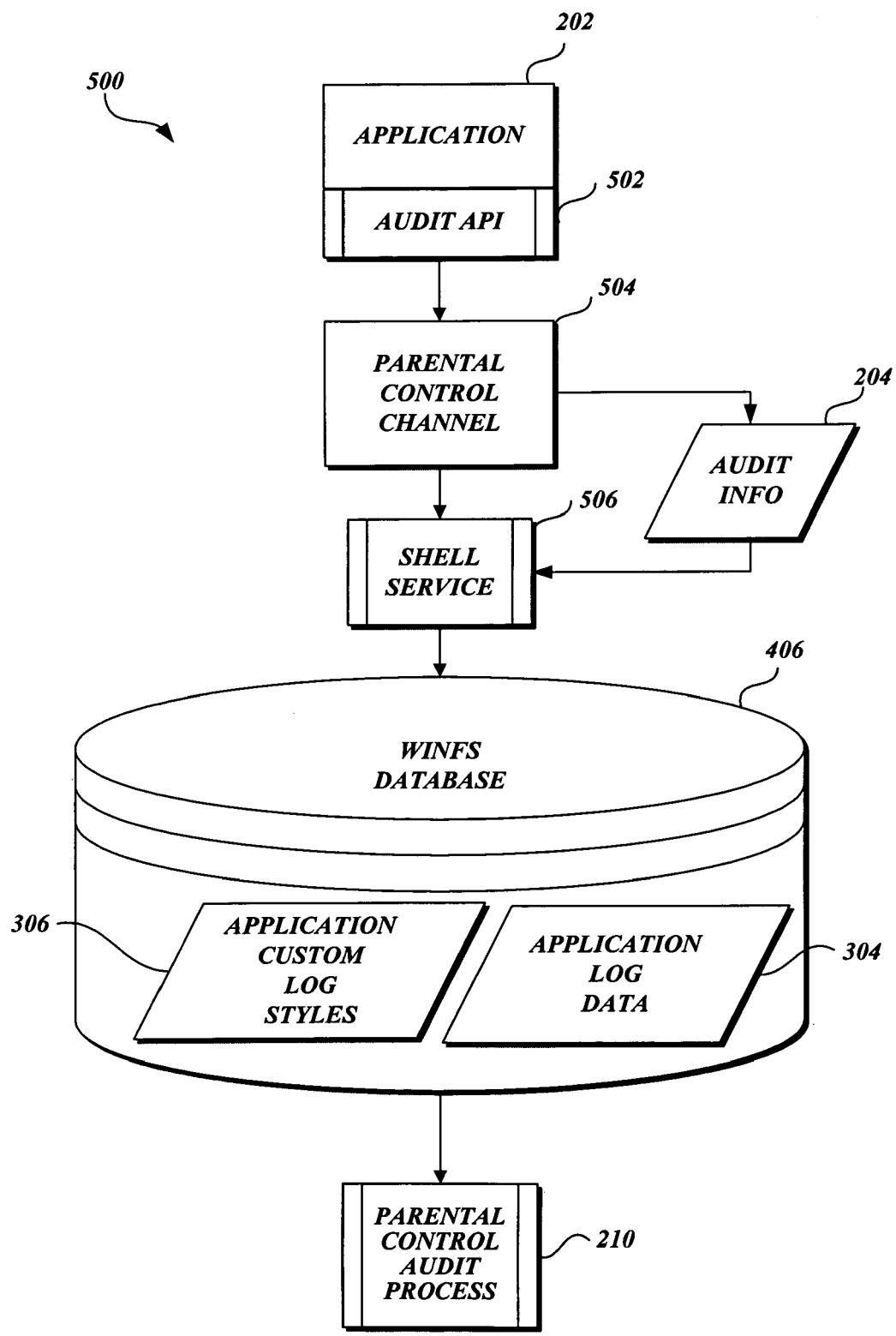
FIG. 5 is a block diagram of another exemplary arrangement of certain components of a parental control system of FIG. 1 illustrating the custom logging of application-originated parental control audit information and custom log styles in accordance with the present invention.

FIG. 5 is a block diagram of another exemplary arrangement 500 of certain components of a parental control system of FIG. 1 illustrating the custom logging of application-originated log data 304 and custom log styles 306 in accordance with the present invention. In a preferred embodiment, as illustrated in FIG. 5, the application 202 calls an audit API 502 that allows the application 202 to log into a parental control channel 504. Instead of logging audit information 204 directly into the WinFS database 406, the application 202 logs the audit information 204 to the parental control channel 504. A Windows Shell service 506 is configured to "listen" to the parental control channel 504 and pull new event information from the channel to push into the WinFS database 406, including the log data 304 and custom log styles 306 originating from the application 202. As with the embodiment described in FIG. 4, once the audit information 204 is in the WinFS database 406, the application log data 304 and application custom log styles 306 may be accessed by the parental control audit process 210, to generate reports, notifications, etc. as needed.

Figure 6:
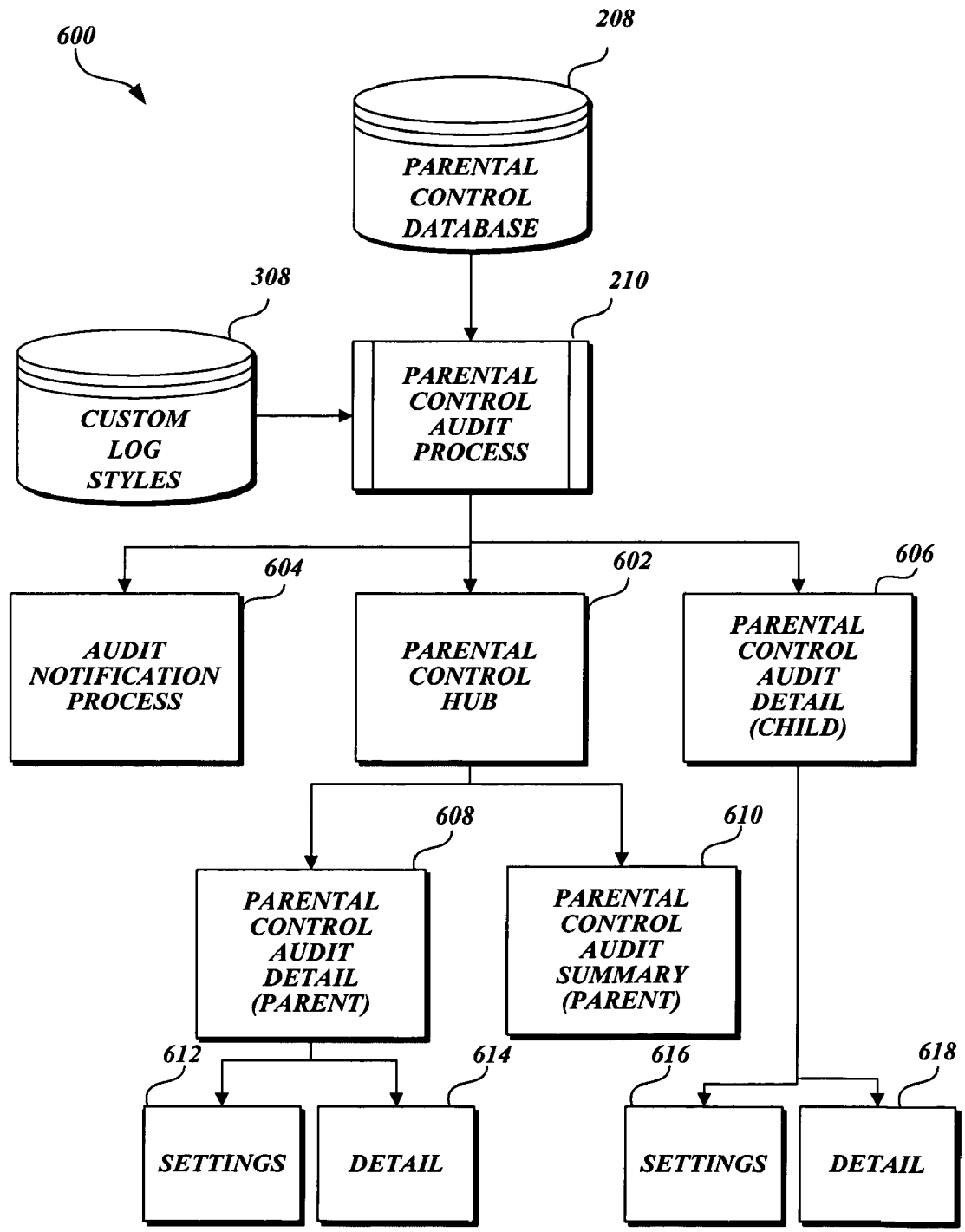
FIG. 6 is a block diagram depicting a general overview of certain components of a parental control audit process of FIG. 2 illustrating notification to a child or parent of a parental control audit, as well as generation of a parental control audit report to a child or parent in accordance with the present invention.

FIG. 6 is a block diagram depicting a general overview 600 of certain components of a parental control audit process 210 of FIG. 2 illustrating notification to a child or parent of a parental control audit, as well as generation of a parental control audit report to a child or parent in accordance with the present invention. As shown, the parental control audit process 210 accesses a parental control database 208 and custom log styles database 308 to generate reports, notifications, etc. as needed. The parental control audit process 210 comprises, among others, an audit notification process 604 to generate the appropriate notifications 214 to the parent or child that a parental control audit is in progress and/or that audit information is available for reporting to the parent or child. In one embodiment, the audit process 210 generates notifications periodically to parents as reminders to check their children's computer usage on a regular basis. The audit process 210 may also operate continuously in real-time to generate a notification 214 to a parent or child whenever an application 202 logs audit information 204 or when an application logs a particular type of audit information, e.g. information from a particular application, such as from a browser navigating to a web site address having questionable content. The notifications may take any number of forms, including an email communication, an instant message, a pop-up notification Window, all of which may contain some type of text message or other indicator, e.g. color, sound, describing the details of the notification, e.g. "An audit report for Toby's computer usage is now available," or "Alert—Toby has exceeded his allotted hours of computer usage," or "Alert—You have exceeded your allotted hours of computer usage and your parent has been notified."

The parental control audit process 210 further comprises a parental control hub 602, which is a user interface that is provided to a parent user for purposes of aiding in the navigation to a parental control audit detail report 608, or a parental control audit summary report 610. An example of the parental control detail report 608 is described in further detail in FIG. 11. Generally, the detail report 608 is used to report all of the detailed information 614 about a particular restricted user's computer usage, e.g. a particular child's use of all of the computers on the home network. The detail information 614 may include a variety of information about different applications that the child has used aggregated across all computer devices in the network. The parental control hub 602 may further include options to produce a report of the current settings 612 for one or more restricted users.

In a preferred embodiment, the aggregated information that is used to generate the audit detail report 608, 614 is obtained from the parental control databases 208 (and custom log style database 308) residing on all of the computer devices in the network, through merging and replicating the data contained in the databases 208, 308 and conducting a local query to the resident databases as will be described in further detail in FIGS. 9-10 below. In an alternate embodiment, the aggregated information is obtained by conducting an aggregated query to each of the databases 208 residing on each device in the network, as described in commonly assigned, co-pending application, U.S. patent application Ser. No. 10/691,872, entitled SYSTEM AND METHOD FOR GENERATING AGGREGATED DATA FILE VIEWS IN A COMPUTER NETWORK, filed on Oct. 23, 2003, and which is incorporated by reference herein.

The parental control audit summary 610 generally contains summary information obtained from the parental control databases 208 (and custom log style database 308) for one or more restricted users, or for one or more applications 202 accessible by restricted users. For example the parent might request the auditing process 210 to produce a summary report 610 of the total number of logon hours, internet hours, etc. for all of her children before requesting a report showing the detailed information for a particular child.

The parental control audit process 210 may further generate a parental control audit detail report 606 from the perspective of the child, or restricted user. That is, the child may submit a request to the parental control audit process 210 to generate a report similar to what is provided to the parent, detailing his or her usage on the home network. In this way, the child can, to a certain extent, self-monitor their usage, and alter their behavior accordingly in an effort to comply with the restrictions placed on them by their parents. The reports 606 from the child's perspective are generally read-only, and may include a report of the settings 616, i.e. the restrictions, currently in place for him or her, as well as the full detail 618 of their computer usage.

Figure 7:
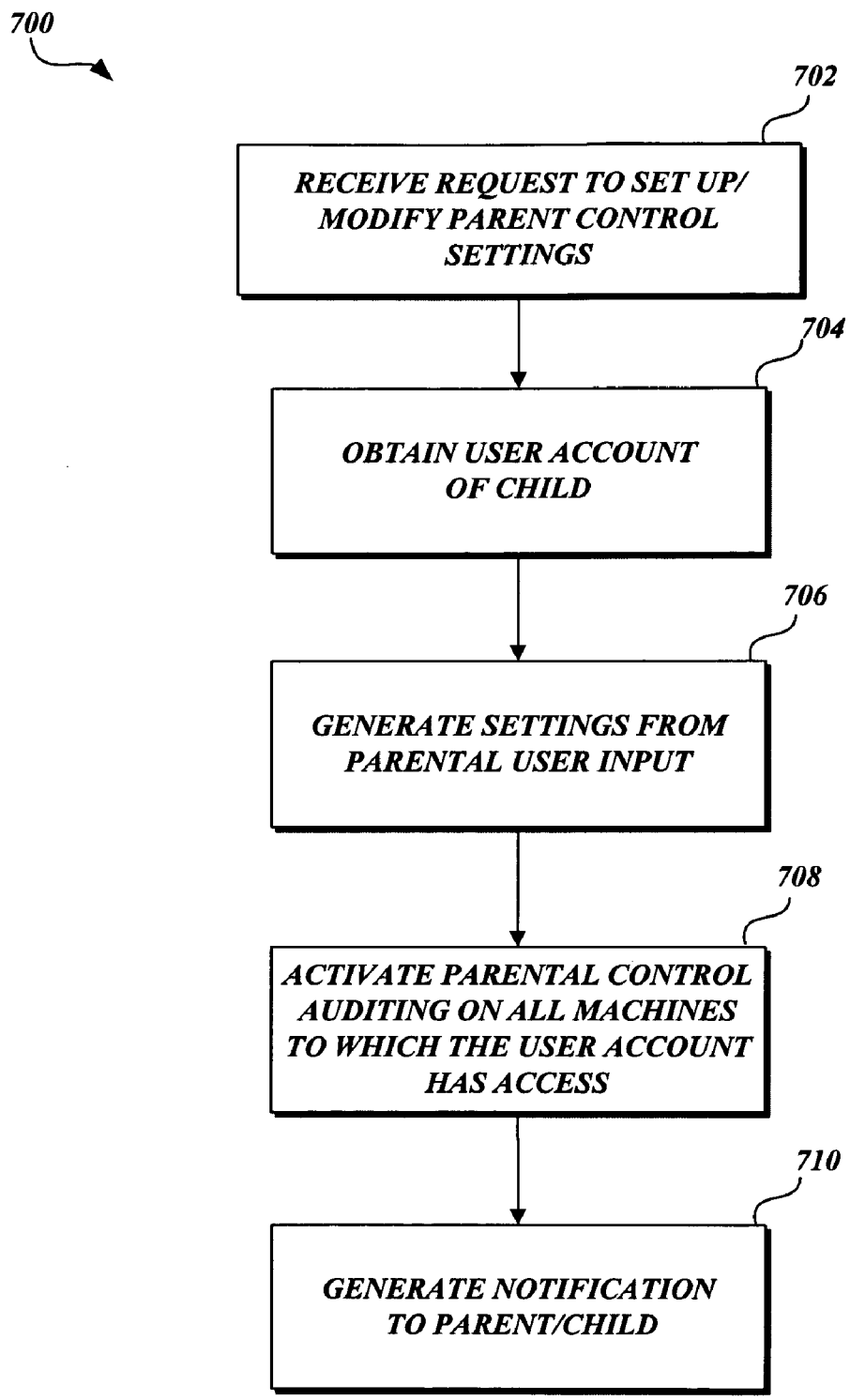
FIG. 7 is a flow diagram illustrating certain aspects of the logic performed by a method for aggregating and extending parental controls auditing in an unmanaged computing network in conjunction with the parental control system illustrated in FIGS. 1 and 2, and in accordance with an embodiment of the present invention.

FIG. 7 is a flow diagram illustrating certain aspects of the logic 700 performed by a method for aggregating and extending parental controls auditing in an unmanaged computing network in conjunction with the parental control system 110 illustrated in FIGS. 1 and 2, and in accordance with an embodiment of the present invention. As shown, at process block 702, the parental control system 110 receives a request from a parent-user to set up and/or modify the parental control settings 216 used in the parental control audit process 210. At processing block 704, the parental control process 210 obtains the user account uniquely identifying the child upon whom the restrictions are placed, and at processing block 706 generates the appropriate settings that will implement the restrictions on the child, based on the parent-user's input.

In operation, at processing block 708, the parental control audit process 210 is activated to control audit reporting an all of the devices in the network to which the identified user account has access. Once activated, at processing block 710, the parental control audit process 210 generates the appropriate notifications to the parent and child users, to notify them of the commencement or termination of a parental control audit, and/or the availability of parental control audit information.

Figure 8:
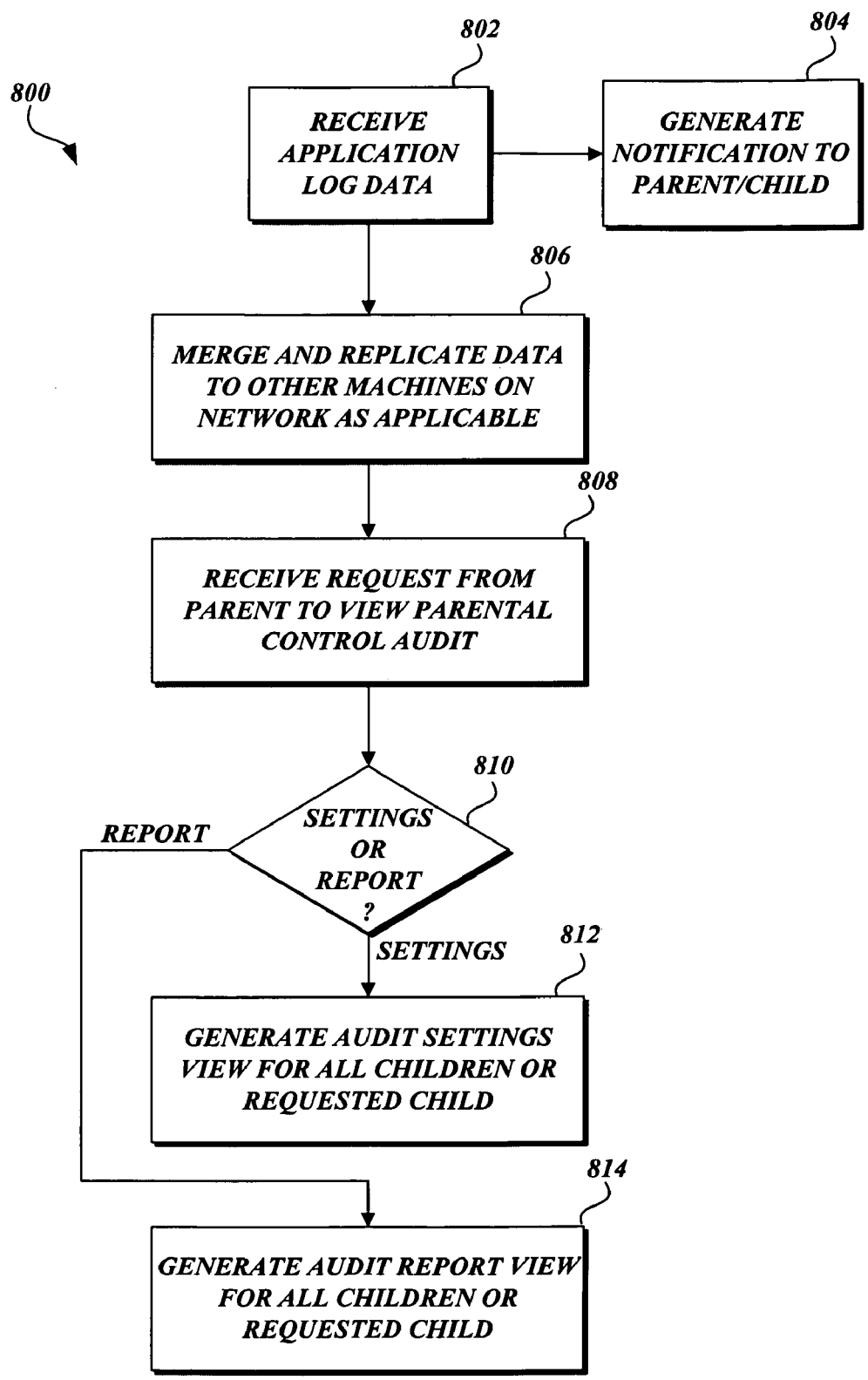
FIG. 8 is a flow diagram illustrating certain other aspects of the logic performed by a method for aggregating and extending parental controls auditing in an unmanaged computing network in conjunction with the parental control system illustrated in FIGS. 1 and 2, and in accordance with an embodiment of the present invention.

FIG. 8 is a flow diagram illustrating certain other aspects of the logic performed by a method for aggregating and extending parental controls auditing in an unmanaged computing network in conjunction with the parental control system 110 illustrated in FIGS. 1 and 2, and in accordance with an embodiment of the present invention. As shown, at process block 802, the parental control system 110 receives application audit information 204 from an application 202 as auditable events occur. As described with reference to FIGS. 3-5, the custom logging event process 302 may be implemented in a number of ways. For example, the audit information 204 may include application log data 304 that is logged directly into a WinFS database 406 for subsequent access by the parental control audit process 210 using a Windows Shell interface to the WinFS database 406, or indirectly via a parental control channel 504. In one embodiment, the application 202 may customize and extend the audit reporting available through the parental control audit process 210 by also including custom log style data 306 in the audit information 204 during the logging process 302, or earlier, when the application is first activated, and registers with the parental control audit process 210.

Processing continues at process block 804, where the parental control audit process 210 generates a parental control audit notification 214 to the parent-user and/or child-user notifying them that parental control auditing has commenced or terminated, as the case may be, or that specific audit information 204 has been logged and is available for reporting. In one embodiment, the notification 214 is generated automatically on a periodic basis to remind the parent that a new audit report is ready for the parent to review. In this way, the notification 214 aids parents in remaining vigilant in enforcing restrictions on their children's use of the computer. Of course, the described notifications 214 are for the sake of illustration only, and other types of relevant notifications 214 may be generated for the parents and children users affected by the parental control audit process 210 without departing from the scope of the claims that follow.

At processing block 806, the parental control system 110 continues in one embodiment to aggregate the audit information 204 logged in the parental control database 208 (and custom log styles database 308) by periodically, continuously, or on demand, merging and replicating the data contained in the databases 208, 308 with the corresponding databases on every computer device in the network, as will be described in further detail in FIGS. 9-10. In an alternate embodiment, the aggregation of data represented in processing block 806 may be accomplished by sending an aggregated query to all computer devices on the network upon receiving a request from a parent or child to report the audit information. By aggregating the audit information logged in the parental control database 208, the parent can easily determine what their children have been doing on all the computer devices in the home network. From the aggregated information contained in an audit report, the parent can see who the children are communicating with, where they go on the web, and which applications they run on the different computers in the household. For example, the audit report may quickly highlight the fact that a child visits a questionable web site only from the computer in their bedroom.

At processing block 808, the parental control audit process 210 receives a request from a parent user (or child user, as the case may be) to view information available in the parental control database. In one embodiment the request may be in the form of a query that contains a set of criteria to apply against the parental control database 208 to match all content in which the parent or child user, identified by a user SID security token, can access. Additionally, the query can include any number of additional criteria input by a parent-administrator or child-user, such as specific user SIDs of restricted users, specific applications, date ranges, etc. that can be used to match the audit information contained in the database. One skilled in the relevant art will appreciate that some or all portions of the query string, such as the user SID, may be entered automatically without requiring additional user input. Alternatively, some portion of the query string, such as the additional search criteria, may be specified by user at the time the request is made, or may be pre-determined as part of a configuration of the computing device in the network from which the request is made.

In response to the request, the parental control audit process 210 obtains the aggregated data as described with reference to processing block 806, and determines at decision block 810 whether the user wishes to view the parental control settings 216 that are currently in place to restrict one or more users, or whether they wish to view a detail or summary audit report of the audit information currently available.

At processing block 812, the parental control audit process 210 generates a view of the requested audit settings for all of the restricted users, or a particular restricted user, in accordance with the request received in processing block 808. At processing block 814, the parental control audit process 210 generates a view of the requested audit report for all of the restricted users, or a particular restricted user, in accordance with the request received in processing block 808. When the request has been received from a restricted user, i.e., a child, then the audit settings or report is generated from their perspective as appropriate.

Figure 9:
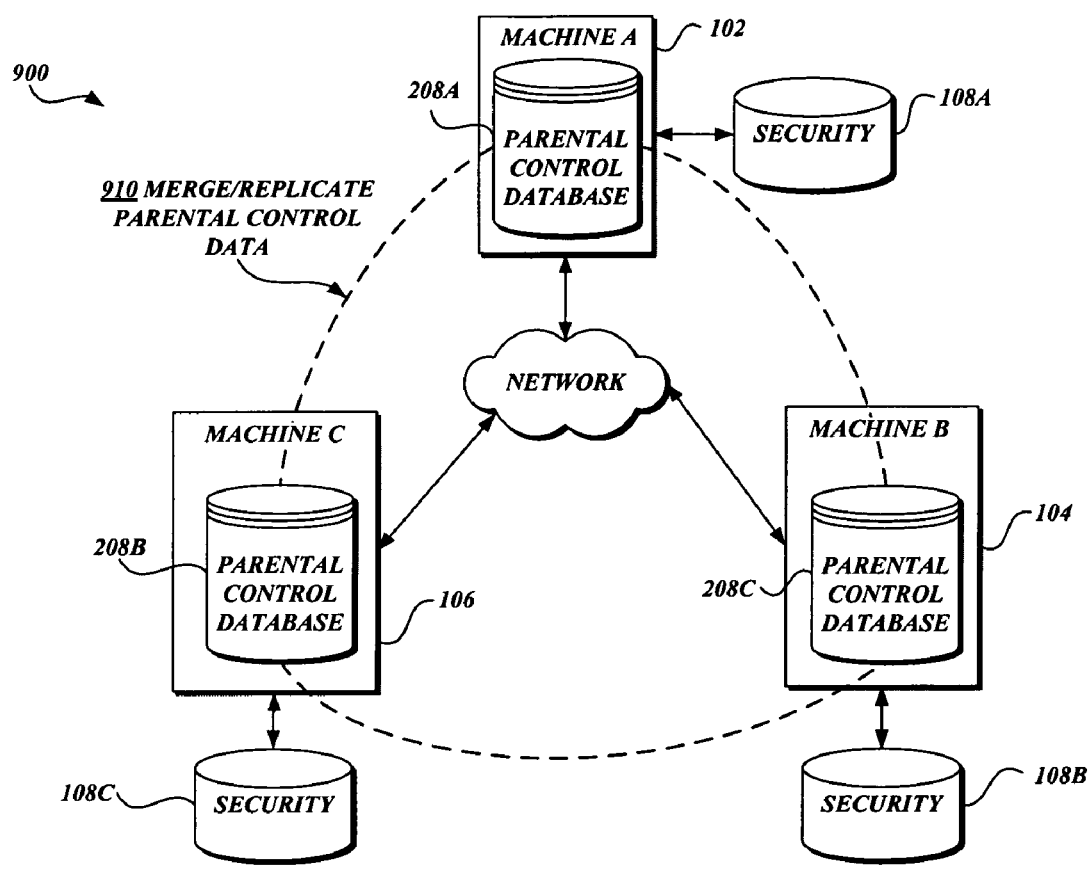
FIG. 9 is a block diagram of the computer network of FIG. 1 illustrating the merging and replicating of parental control databases residing on the networked computing devices in accordance with the present invention.
Figure 10:
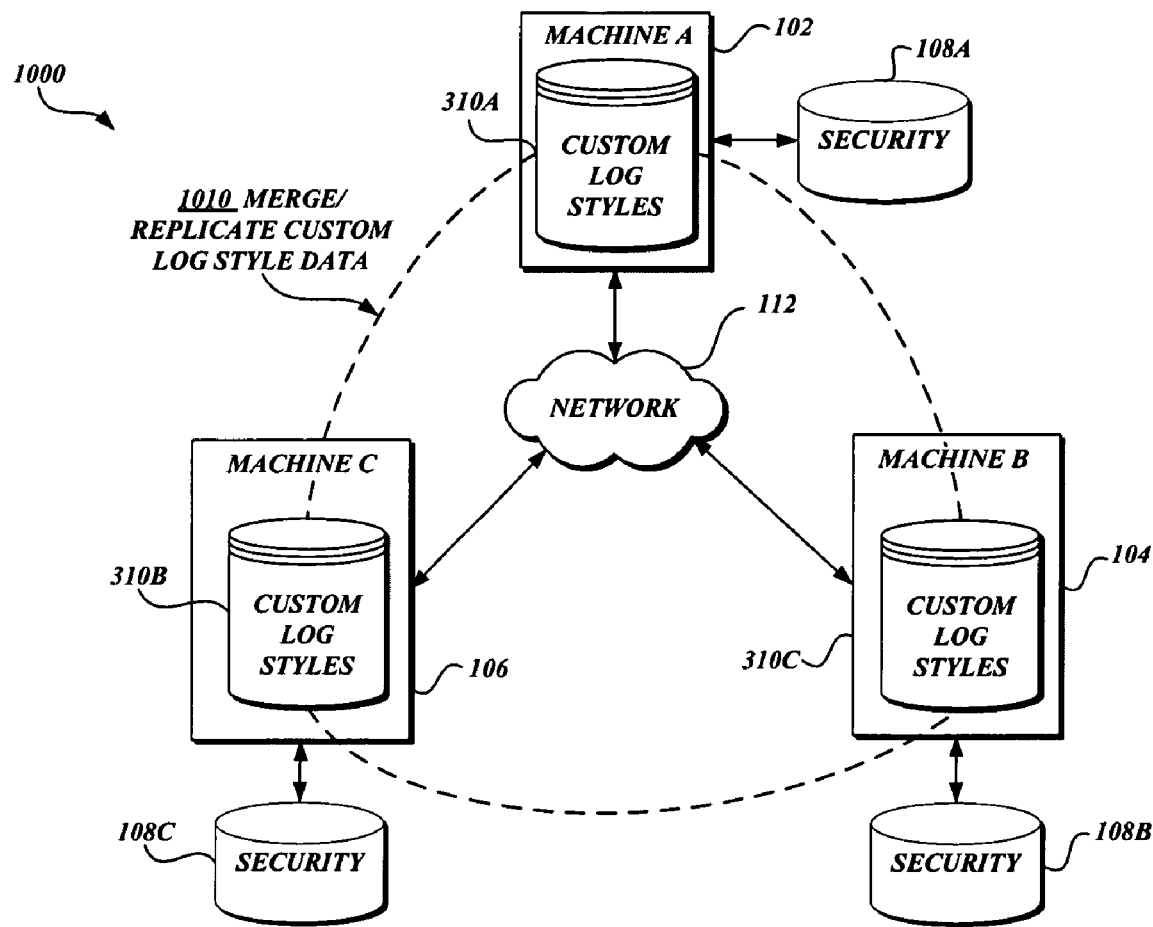
FIG. 10 is a block diagram of the computer network of FIG. 1 illustrating the merging and replicating of custom log styles databases residing on the networked computing devices in accordance with the present invention.

FIGS. 9 and 10 are block diagrams 900, 1000 of the computer network of FIG. 1 illustrating the merging and replicating of databases residing on the networked computing devices in accordance with the present invention. As noted earlier, in a preferred embodiment, the audit information 204 comprising application log data 304, and optionally custom log style data 306 is maintained in a parental control database 208 and custom log styles database 308 that is synchronized, i.e., merged and replicated, with similar data on each computing device in the home network. FIG. 9 depicts the merging and replication 910 of the parental control database 208 in the unmanaged network 100 between each of the three computing devices 102, 104, and 106 in which the parental control database resides. Likewise, FIG. 10 depicts the merging and replication 1010 of the custom log styles database 308 in the unmanaged network 100 between each of the three computing devices 102, 104, and 106 in which the custom log styles database resides.

Figure 11:
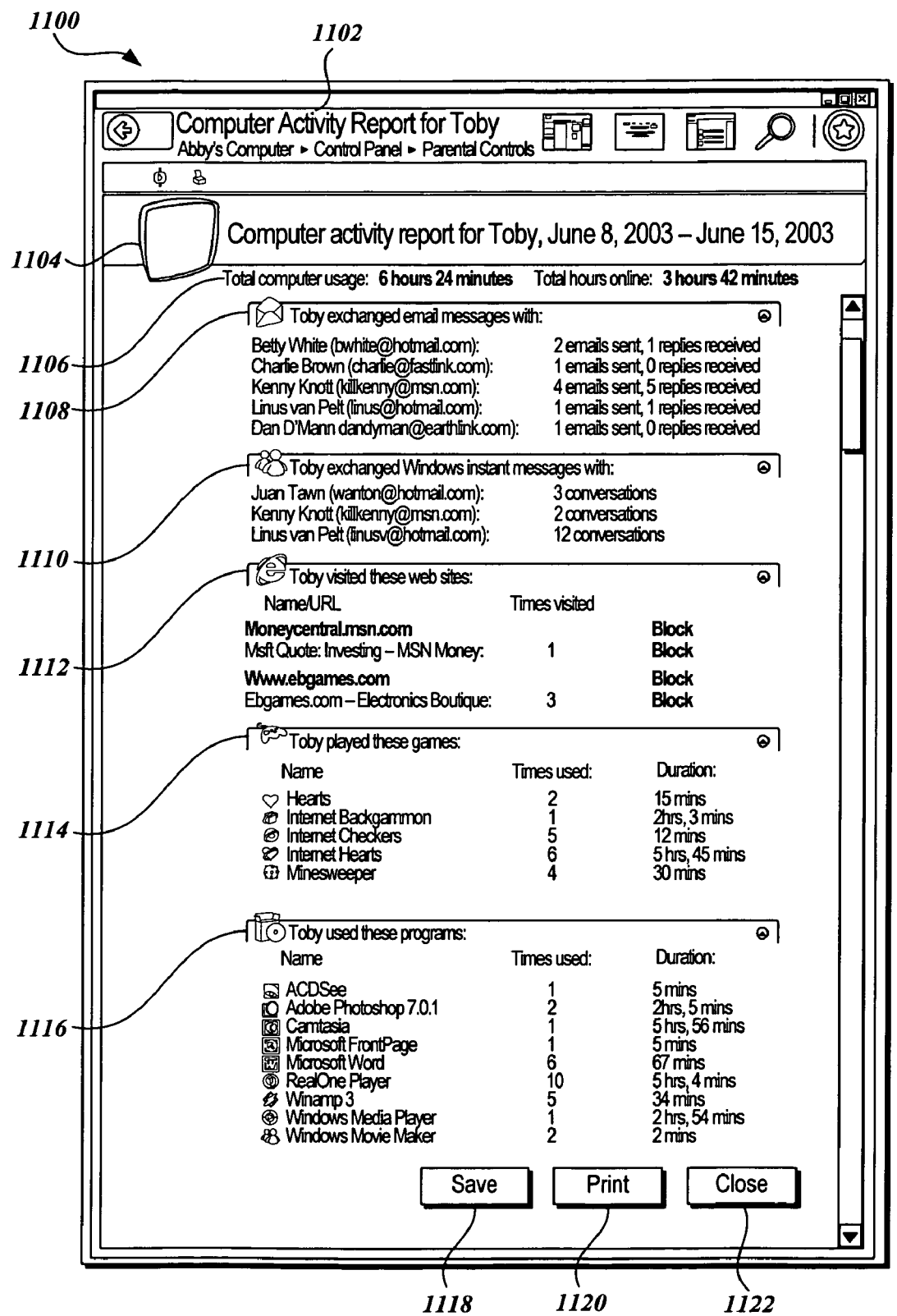
FIG. 11 is a pictorial diagram of an exemplary parental control audit report and user interface formed in accordance with an embodiment of the present invention.

FIG. 11 is a pictorial diagram 1100 of an exemplary parental control audit report and user interface 1102 formed in accordance with an embodiment of the present invention. As shown, in the illustrated embodiment, the audit report 1102 entitled "Computer Activity Report for Toby" is generated within a browser application window 1100, and specifies in the upper section 1104 that the activity report is for Toby's activity between the dates of Jun. 8, 2003 and Jun. 15, 2003. In the illustrated example, the report lists Toby's total computer usage and total hours online at 1106 as "6 hours 24 minutes," and "3 hours 42 minutes," respectively. Below the total usage statistics are listed five additional sections, an email section 1108, an instant messaging section 1110, a web site section 1112, a game section 1114, and an application section 1116. Of course other types of sections, e.g. a movies section, may be incorporated into the audit report without departing from the claims that follow.

The email section at 1108 entitled "Toby exchanged email messages with:" is followed by a scrollable listing of the individuals with whom Toby exchanged emails, including the individual's email address, and the total number of emails and replies that were sent. Likewise, the instant messages section 1110 entitled "Toby exchanged Windows instant messages with:" is followed by a scrollable listing of the individuals with whom Toby exchanged instant messages, including the individual's email address, and the total number of conversations that were conducted.

The web site section 1112 entitled "Toby visited these web sites:" is followed by a scrollable listing of the name/URL of the web site that was visited and the number of times that it was visited. Additional information, such as whether the site was blocked may be listed as well. The game section 1114 entitled "Toby played these games:" is followed by a scrollable listing of the names of the games that Toby played, the total number of times the game was played, and the duration of play. The application section 1116 entitled "Toby used these programs:" is followed by a scrollable listing of the names of the programs that Toby used, the total number of times the program was used, and the duration of use. Of course, the information shown in each section described above is for purposes of illustration only. The selection of which information to show and in what order may vary from one section to the next, and, in the case of applications taking advantage of the extensibility offered by the parental control system 110, may even be controlled by the application 202 from which the information originated via the use of the custom logging information stored in the custom log styles database 308, e.g. the XML schema and XSL style sheets that describe what audit information is to be reported and how.

Additional interactive buttons to facilitate the use of the audit report, such as the Save button 1118, the Print button 1120, and the Close button 1122 may be provided. For example, the Save button 1118 may be used by the parent (or child) to save the audit report 1102 for archival purposes. Of course it is understood that the illustrated audit report 1102 is depicted by way of example only, and that numerous other designs in presenting the auditing information 204 in the report 1102 may be employed without departing from the scope of the claims that follow.

While the presently preferred embodiments of the invention have been illustrated and described, it will be appreciated that various changes may be made therein without departing from the spirit and scope of the invention. For example, in one embodiment of the present invention, the various components of the parental control system 110 and, in particular, the functionality of the parental control audit process 210 and custom logging event process 302, as described above, may be implemented in different combinations of processes, programs, or interfaces, and may be distributed across one or more computing devices in the unmanaged network.

The invention claimed is:

1. In a computer network having at least two computing devices in communication, a method for audit reporting on the network, the method comprising:
   in response to receiving a request from an application to log audit information on a host computing device, logging, at the host computing device included as part of the computer network and associated with a user, the audit information about the user's activities using the device, the audit information being associated with a unique identifier of the user, the request from the application to log the audit information including a request to log the audit information to a control channel from which the logged audit data is periodically transferred to a data repository on the receiving computing device;
   aggregating the logged audit information with similar information residing on other host computing devices on the network so that all computing devices contain all of the audit information associated with the user; and
   in response to one of the computing devices receiving a user request to report all of the audit data contained on the host computing devices associated with the same user, reporting the aggregated audit information about the user's activities, contained on the computing device receiving the request, to the requesting user.

2. The method as recited in claim 1, wherein logging audit information includes registering a universally accessible audit schema that describes what audit information about the user's activities is being logged.

3. The method as recited in claim 2, wherein the audit schema is an XML schema.

4. The method as recited in claim 1, wherein logging audit information further includes generating a universally accessible audit style that describes how the audit information about the user's activities should be presented during reporting.

5. The method as recited in claim 4, wherein the audit style is an XML style sheet.

6. The method as recited in claim 1, wherein aggregating the logged audit information includes synchronizing the information with logged audit information residing on other host computing devices on the network.

7. The method as recited in claim 1, wherein aggregating the logged audit information includes querying logged audit information residing on other host computing devices on the network and merging the results of the query into the host computing device from which the query originated.

8. The method as recited in claim 1, wherein the audit information is related to a restriction associated with the user, the restriction including at least one of a restriction on amount of computer usage, time of computer usage, date of computer usage, web sites visited, and applications activated.

9. The method as recited in claim 1, further comprising generating a notification to a user, including a notification to a user whose activities are being audited that the audit information has been logged on one of the computing devices, and a notification to an administrator of the network that authorized audit reporting.

10. The method as recited in claim 9, wherein the notification includes one of a reminder of the availability of logged audit information from which reporting may be performed, an alert that a particular item of logged audit information is available, an indication that audit reporting has commenced, and an indication that audit reporting has ceased.

11. The method as recited in claim 9, wherein the reminder is generated on a periodic basis.

12. The method as recited in claim 9, wherein the reminder is generated in real-time in response to logging a particular item of audit information.

13. The method as recited in claim 9, wherein the reminder is one of an electronic mail communication, an instant message, a pop-up message in a display device in communication with the network, and a message on a wireless communication device.

14. A computer-readable storage medium having computer-executable instructions for performing the method recited in claim 1.

15. A computer system having a processor, a memory and an operating system, the computer system configured to perform the method recited in claim 1.

* * * * *